April 30, 1946. C. B. VICKERS 2,399,270
HYDRAULIC BRAKE SYSTEM
Filed Oct. 18, 1943 3 Sheets-Sheet 1
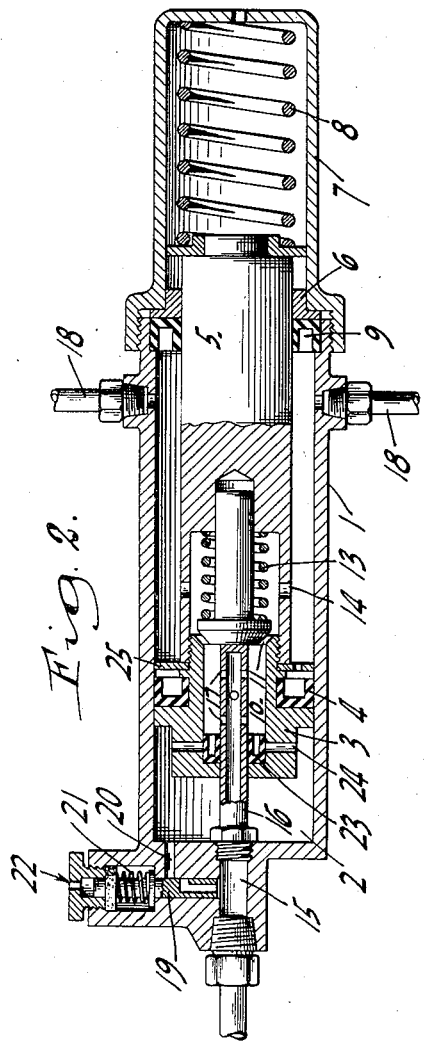
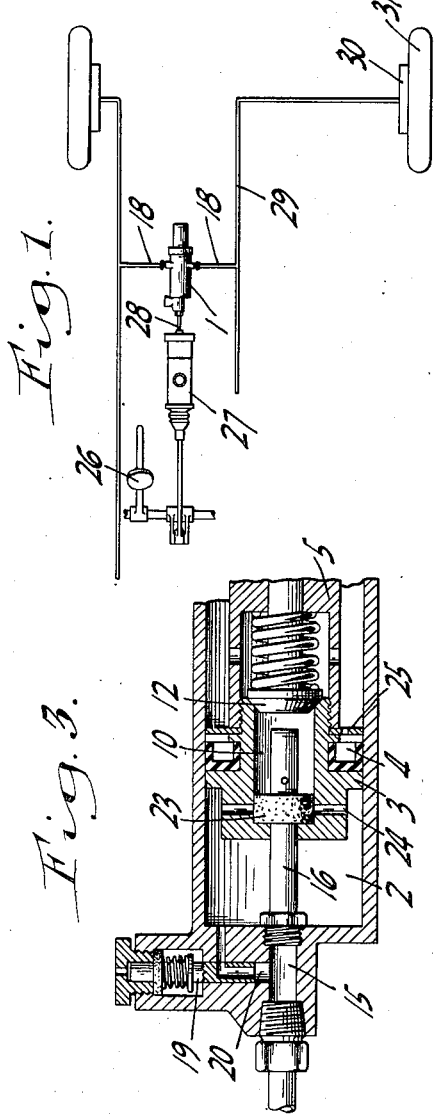
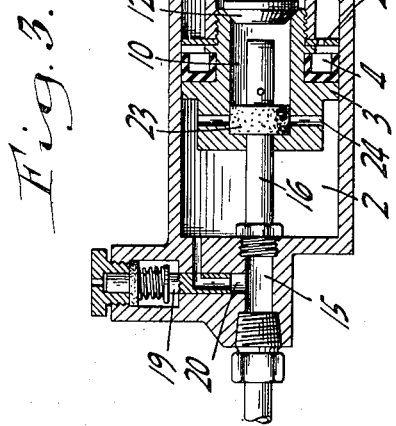
INVENTOR
Carroll B. Vickers
BY Strauch & Hoffman
ATTORNEYS

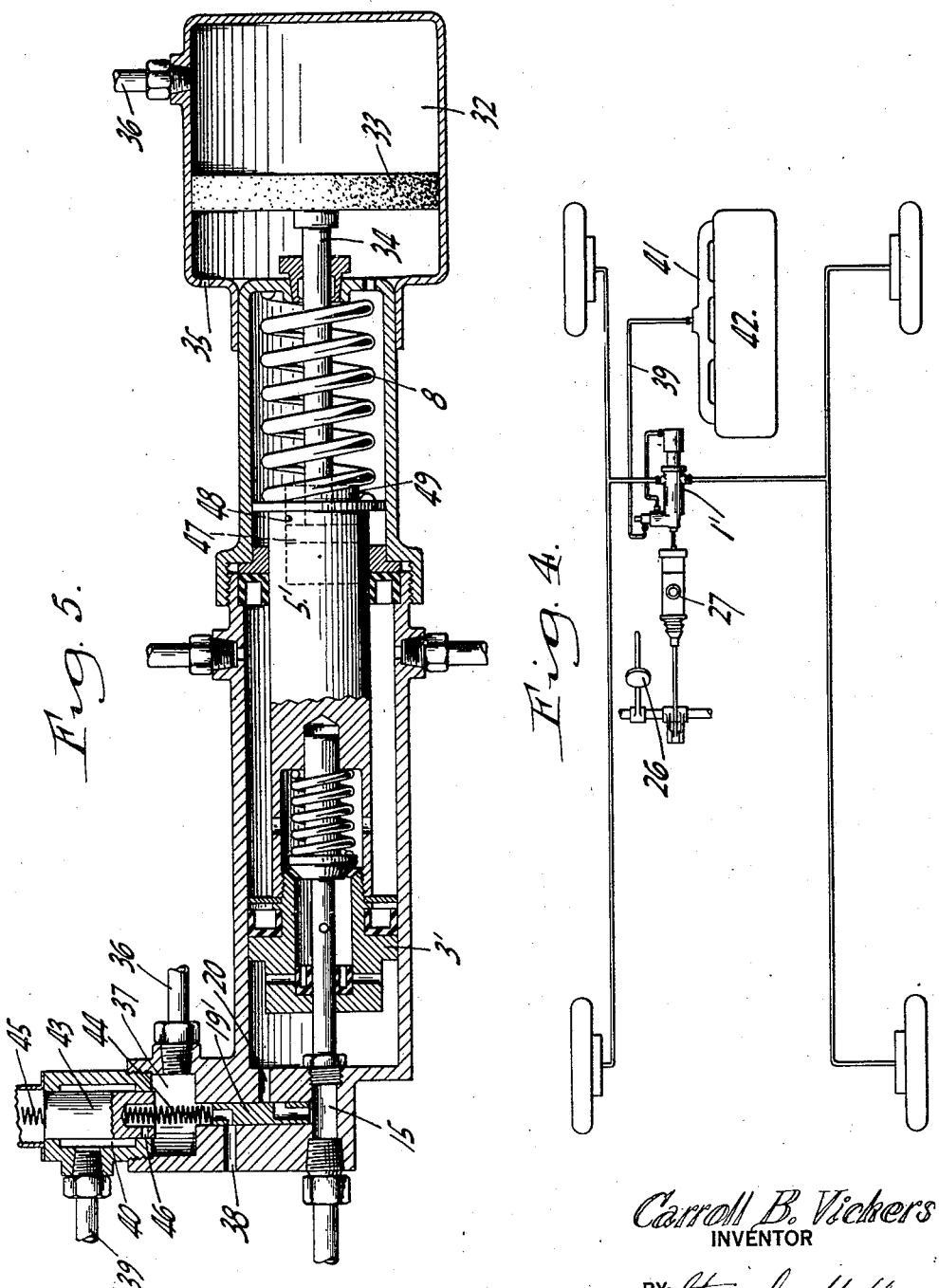

April 30, 1946.  C. B. VICKERS  2,399,270
HYDRAULIC BRAKE SYSTEM
Filed Oct. 18, 1943  3 Sheets-Sheet 3

Inventor
Carroll B. Vickers

By Strauch & Hoffman
Attorney

Patented Apr. 30, 1946

2,399,270

UNITED STATES PATENT OFFICE 2,399,270

HYDRAULIC BRAKE SYSTEM

Carroll B. Vickers, Buffalo, N. Y., assignor to The Timken-Detroit Axle, Company, Detroit, Mich., a corporation of Ohio Application October 18, 1943, Serial No. 506,737

20 Claims. (Cl. 60—54.5)

This invention relates to a power unit and more particularly to a hydraulic force multiplying unit such as might be used in hydraulic brake systems of automobiles, or in hydraulic presses, or other machines in which the hydraulic principles of power amplification might be utilized.

This is a continuation-in-part of my co-pending application Serial No. 396,412, filed June 3, 1941.

The primary object of the present invention is to provide a power unit which is efficient in operation and simple and durable in construction.

The invention further has for its object to provide a novel arrangement of parts by which the pressure on the hydraulic body is initially applied to the work performing part in a direct manner and subsequently applied in an indirect manner through the power multiplying action of the unit.

Still further, the invention has for its object to provide a power unit with a novel booster arrangement by which the operation of the power unit may be greatly facilitated.

In the drawings which illustrate three embodiments of the present invention,

Fig. 1 is a fragmentary diagrammatic view depicting the present invention as applied to a hydraulic brake system of a motor vehicle;

Fig. 2 is a longitudinal sectional view through the power unit per se with portions left in elevation;

Fig. 3 is a fragmentary sectional view similar to the disclosure in Fig. 2 but showing the piston in operative position;

Fig. 4 is a diagrammatic illustration of a motor vehicle brake system incorporating a modified form of power unit;

Fig. 5 is a longitudinal sectional view through the modified embodiment, with portions left in elevation.

Figure 6:
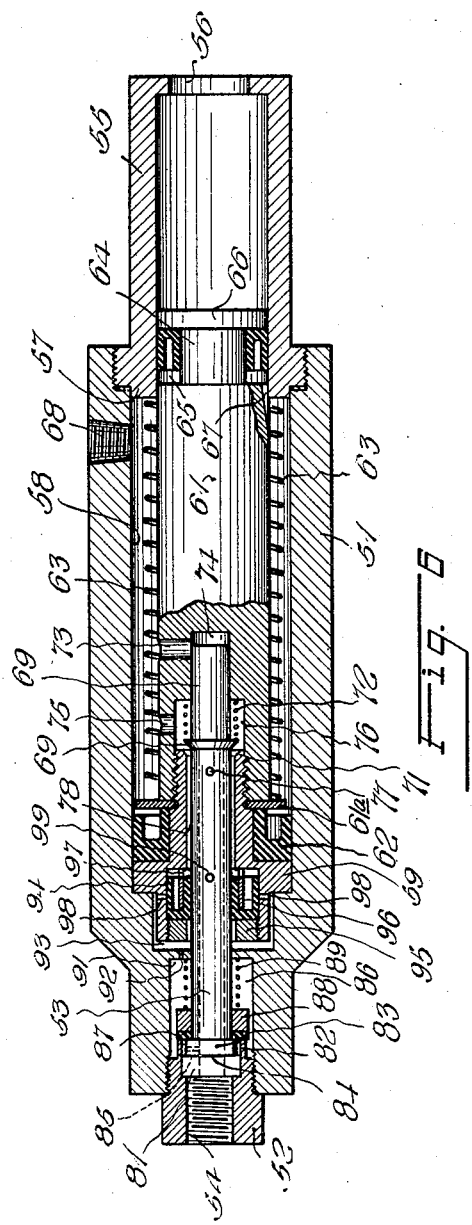
Fig. 6 is a longitudinal sectional view through a further modification of the invention.

Referring more particularly to the drawings, and especially to Fig. 2, the numeral 1 designates the cylinder body of the motor or power unit having a chamber 2 in which slides a piston 3. Packing 4 provides the desired fluid seal with the walls of the chamber and divides the latter into fore and aft portions. The piston has a forwardly extending but reduced stem 5 slidably supported by a bearing collar 6 which is removably clamped in position against the adjacent end of the cylinder by the hollow cap or head 7 having a vent opening. This cap is threaded onto the cylinder and supports an enclosed coiled spring 8 under compression against the protruding end of the stem 5 for yieldably holding the piston in its normal position at the opposite end of the cylinder chamber. Packing 9 supported by the bearing collar 6 fluid seals the stem 5 where it leaves the chamber.

The piston has a self contained valve chamber 10 with an internal seat 11 engageable by a check valve 12 under the urge of a spring 13. Communication between the cylinder chamber and the self contained piston chamber is established through one or more openings 14.

The inlet passage 15 to the motor chamber delivers the liquid by means of nozzle 16 into the piston contained valve chamber to the exclusion of the aft portion of said motor chamber. To this end the nozzle has discharge holes 17 opening into the valve chamber, and the length and position of the nozzle are such with respect to the valve 12 as to normally engage and hold the latter unseated. Consequently, the inflowing liquid will pass through the orifice of the valve seat and the openings 14 out into the fore portion of the cylinder chamber and from thence out into the system through one or more connections 18.

After the system has been filled with the liquid and the pressure on the latter raised to a predetermined degree, means are provided to apply such pressure to the back end of the piston by admitting the fluid to the aft portion of the chamber 2. This pressure responsive means is shown as a valve 19 which is arranged in a branch passage 20 leading from the inlet passage directly into the aft portion of the cylinder chamber, the valve being normally held in a passage closing position by a spring 21 which may be regulated by an adjustable nut 22 having a suitable vent opening. At a predeterminable pressure the valve 19 will yield and open the metering passage whereupon the fluid pressure will act upon the back end of the piston and propel it forwardly. As the piston starts in motion, the check valve 12 will close and thereby trap the body of fluid ahead of the piston body 3 so that upon continued piston movement the trapped liquid will be subjected to increased pressure. During this movement the piston slides upon the cylinder carried nozzle at a rate determined by the diameter of the port 20. I have found that by making passage 20 of restricted diameter, so as to exert a definite metering or throttling action upon the fluid admitted behind the piston, a highly desirable blending of the two stages of operation is achieved, which makes possible the full utilization of the compounding action of the unit. In other words, when the valve opens, initiating the second stage of operation, port 20 exerts a controlling action upon the fluid and prevents too rapid actuation of the piston. Accordingly, if the operator should suddenly depress the brake pedal and cause a rapid build up of pressure, the metering action of port 20 will delay or retard advance of the piston sufficiently to allow fluid to pass through ports 14 and take up the slack prior to seating of valve 12. Otherwise the fluid would advance the piston and close valve 12 and by-pass the initial stage, with the result that the slack would have to be taken up in the second or compounding stage, resulting in "loss of pedal" and the consequent loss of effective braking.

Suitable packing 23 seals about the nozzle to prevent leakage. A flange portion of this packing may also serve as a check valve for normally closing one or more radial ports 24 which provide for the return flow of fluid from the aft portion of the cylinder chamber into the main line after the pressure has been relieved, this return flow being effected by the reverse stroke of the piston under the urge of the spring 8. The piston may be made in two parts threaded together to facilitate the placement of the packing 4, a ported washer 25 being clamped between the piston parts.

In Fig. 1 the force multiplying power unit is shown incorporated in the hydraulic brake system of a motor vehicle, and referring to this view the brake pedal 26 is connected to the master cylinder 27 for subjecting the hydraulic body to pressure in a well known manner, the master cylinder being connected by a conduit 28 to the inlet 15 of the power unit. The distributing connections 18 are joined to the brake lines 29 which transmit the pressure to the usual individual brake cylinders carried within the drums 30 of the vehicle wheels 31. Therefore, when the pedal 26 is depressed, the slack in the brakes will be initially taken up by the direct action of the hydraulic body and then, as the pressure reaches the point predetermined by the adjustment of the spring 21, the brake determining valve 19 will open and cause a direct application of the liquid pressure on the back end of the piston 3 to move it forwardly. In this connection it will be noted that the surface area of the back end is greater than the effective surface of the front end of the piston and therefore the differential will be utilized in subjecting the trapped body of liquid to a much higher pressure and in a rapid manner. Upon the release of the foot pressure on the pedal 26, the spring 8 will return the piston and, since the valve 19 will then close, the fluid displacement from the aft portion of the cylinder chamber will be effected through the ports 24, it being understood that, when the piston is moving forwardly during the brake applying operation, the pressure in space 10 maintains seal 23 cupped out in sealing relationship to ports 24.

In the modification illustrated in Figs. 4 and 5, a boosting motor comprising a chamber 32 and a piston 33 is employed to aid in moving the piston. In the illustrated embodiment the boosting piston 33 is joined by a piston rod 34 to the stem 5' of the piston 3'. The boosting motor is preferably operable by suction. Therefore, with the back face of the piston 33 being vented to the atmosphere through a hole 35, when suction is applied to the front side through the conduit 36, the booster will function to draw the braking piston 3' to the right. Upon interrupting the suction communication the power spring 8 will return both pistons as a unit.

For regulating or controlling the boosting action of the motor 32, 33, a compensating regulator is interposed in the suction line. Normally the passage or conduit 36 which opens into a chamber 37 is venting to the atmosphere through a normally open port 38. This port is adapted to be closed by the brake determining valve 19' when the branch passage 20 is opened. A conduit 39 connects a second chamber 40 to the intake manifold 41 of the motor vehicle engine 42. Between the two chambers 37 and 40 a valve 43 is normally balanced by a pair of opposed springs 44 and 45, these springs serving to support the valve 43 to interrupt communication between the two chambers. The spring 44 serves as a yieldable connector between the valves 19' and 43. Therefore, when the predetermined pressure in the master cylinder is reached, the valve 19' will open the branch passage 20 and close the venting port 38. This action serves to compress the spring 44 and thereby unbalance the valve 43 to move the latter upwardly for uncovering a port 46 which establishes communication between the two chambers 37, 40. The suction line is now open to the booster chamber 32 so that the piston 33 will act on the brake applying piston 3' along with the assistance given by the admission of the hydraulic pressure to the back end of the braking piston. Should the operator now hold his foot still, the pressure in the inlet passage 15 will cease building up and permit the valve 19' to again close the branch passage 20. Consequently the valve 43 will again become balanced and interrupt the suction communication. Further depression of the pedal 26 will again open the branch passage 20 and unbalance the valve 43 for further boosting action.

In Fig. 6 there is disclosed a modified form of the invention which differs primarily from that shown in Figs. 1 to 3, inclusive, by locating all the ports coaxially; providing a port uncovered by movement of the piston to expose the latter to the actuating fluid pressure independently of the pressure responsive valve, and in which certain elements of the structure are re-designed and re-arranged to simplify the device and facilitate assembly and disassembly.

In this form of the invention, body 51 has a reduced end into which a fitting 52 is screwed. The latter carries a stem assembly 53, and is provided with a tapped opening 54 into which master brake line 28 is threaded. Threaded into the large end of body 51 is a cylindrical guide 55, having an open end 56 and a radial face 57 forming a shoulder at the end of main cylinder 58. Slidable in the latter is a piston 59, which is threaded into a plunger 61, a washer 61a and a seal 62 being interposed between the ports. A compression spring 63 seats against washer 61 and reacts against shoulder 57 to normally hold the piston in the position shown in Figure 6 when the brakes are released.

Piston body 61 has a reduced end 64 to which a seal 65 is secured by means of a cap 66, which has a good sliding fit with guide 55, so as to accurately guide the piston. Seal 65 is of cupped form, and in order to insure sufficient fluid pressure to properly expand it out against the walls of the guide, piston body 61 is provided with a recess 67 communicating with the space behind the seal. The braking pressure developed in the cylinder is transmitted through one or more openings 68 in the cylinder side wall to the wheel cylinders.

The staging of pressures is effected in this form of the invention as follows. A valve 69 is slidably mounted in piston body 61 and is urged toward a seat 71 on piston section 59 by means of a spring 72, a cross bore 73 placing the valve stem guide 74 in communication with the cylinder, so as to equalize pressures and prevent trapping of fluid in the guide. If desired, a similar bleed passage may be utilized in the previously described forms of the invention. A second cross bore 75 constantly places valve chamber 76 in communication with the cylinder. In the released position of the ports shown in Figure 6, the forward end of stem 53 holds valve 69 open against the action of spring 72, and a port 77 in the stem, communicating with a large annular space or chamber 78 around the stem, places the master cylinder in communication with the booster cylinder ahead of the piston by way of valve chamber 76 and port 75, with the result that when the ports are in this position actuation of the master cylinder applied fluid pressure directly to the wheel cylinder to take up slack and bring the brake shoes into contact with the brake drums.

The second or high pressure stage of operation is effected by a valve associated with the base of the stem. As seen in Figure 6, the stem is provided with an enlarged base 81, which is sweated or secured in any other suitable manner to fitting 52, the latter having a flange or skirt 82 overlying an annular recess 83 provided on the base by a shoulder 84. One or more radial passages 85 place the hollow stem in communication in annular recess 83. Cooperating with skirt 82 to control fluid flow into a chamber 86 in the booster body is a valve 87 which is backed up by a member 88 and a spring 89, the latter seating against a partition 91 having one or more apertures 92 to permit fluid passing through passages 85 and chamber 86 into the reduced end 93 of the cylinder and act upon the rear face of the piston. Leakage of fluid forwardly along the stem is precluded by means of a seal 94 retained in a recess in the piston by a nut 95 and urged into sealing cooperation with the stem by means of a sleeve 96 having apertures 97 for a purpose that will hereinafter appear. One or more radial ports 98 are provided in the reduced end of piston 59 to permit fluid to be returned to the master cylinder upon release of the braking pressure. One or more openings 99 in stem 53, shown valved off by seal 94 in Fig. 6, are adapted to permit fluid to flow directly from the stem to the rear face of the piston when the latter moves forwardly sufficiently to cause seal 94 to uncover them.

The operation of this form of the invention is broadly the same as that of those previously described. In the first stage of operation, with the parts disclosed in the released position shown in Fig. 6, when the pedal is depressed fluid from the master cylinder is admitted through fitting 52 and hollow stem 53 and passes through port 77; open valve 69; port 75 into the main cylinder, whence it passes through opening 68 to the brake cylinders, it being understood that this condition obtains until the slack has been taken up and the shoes brought into engagement with the brake drums.

When the shoes have been engaged with the drums and the pedal is further depressed and a predetermined pressure has built up in the fluid in the line and in fitting 52, valve 87 is lifted off its seat against the action of spring 89, and fluid is forced through chamber 86 and openings 92 into space 93 behind the piston. The piston is thereby advanced and as it moves forwardly spring 72 closes valve 69, thereby trapping the fluid ahead of the piston, so that thereafter a higher pressure is applied to the wheel cylinders, due to the difference in effective areas of the front and rear faces of the piston. After valve 69 has closed as just described, and the piston moves forwardly a further distance, seal 94 uncovers ports 99 in the stem, and thereafter brake fluid flows directly from the stem into space 86 behind the piston. If at any time during the foregoing operation downward travel of the brake pedal is arrested, the brakes will be maintained applied, by reason of the fluid acting upon the large area face of the piston and the latter exerting force upon the trapped fluid ahead of the piston.

When the brakes have been applied as just described, and the brake pedal is released, the brake retracting springs return the fluid to cylinder 58, and spring 63 forces the piston to the left. Under these conditions, valve 87 which has been closed by spring 89 causes rearward travel of the piston to develop pressure in chambers 86 and 93, which forces fluid through openings 98 in the piston past seal 94, through openings 97 and to the interior of the stem by way of openings 77, it being understood that during the brake applying operation the pressure in space 78 is sufficiently high to keep seal 94 expanded into sealing relationship with openings 98. When the piston has moved rearwardly a predetermined distance, the end of stem 53 opens valve 69, and thereafter fluid from the brake lines is returned through openings 75 and chamber 76 to the interior of the stem, the piston in the meantime being returned to the position shown in Fig. 6 by spring 63.

It should be observed that in the form of invention illustrated in Figure 6 valve 87 is wholly contained in chamber 86, with the result that, when downward travel of the brake pedal is momentarily arrested, the pressures acting upon opposite sides of the valve become equalized and spring 89 seats it. However, port 99 maintains communication between the stem and the rear face of the piston, thereby maintaining the braking pressure in the wheel cylinders. In the device of Figures 1 to 3, inclusive, maintenance of braking pressure, when brake pedal movement is arrested, is achieved in a somewhat different manner. Inasmuch as the outer end of valve 19 is open to the atmosphere, the pressure in passage 15 will constantly maintain it open, once the pressure has built up sufficiently to overcome spring 21, and therefore when depression of the brake pedal is momentarily arrested, valve 19 will remain open and maintain the rear face of the piston in fluid communication with the interior of the stem.

In the form of invention shown in Figure 6, a blending of the two stages of operation, similar to that described in conjunction with the other forms of the invention, is also obtained. This is achieved by making passages 85 and/or 92 of sufficiently small diameter to exert a throttling action upon the fluid when valve 87 is opened, with the result that the transition from the low to the high pressure stage of operation is achieved without a sudden change in pedal "feel," because unseating of the valve does not produce a sudden pressure drop in the master cylinder. This is highly desirable because it gives the operator the impression that adequate braking power is available at all times, irrespective of the pedal position, and yet the device brings about a desirable "compounding" of pressures. Also, the metering action of the ports delays or retards actuation of the piston sufficiently to preclude by-passing of the first stage, and insures taking up of the slack by fluid passing directly through ports 75 prior to seating of valve 69.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A hydraulic power unit comprising a cylinder having a fluid containing chamber, a piston operable back and forth therein with a sliding fluid-sealed fit and dividing the chamber into fore and aft portions, said piston having a larger effective area in said aft portion than in said fore portion of said chamber, resilient means urging the piston to a normal position at one end of its stroke, said piston having a chamber normally communicating through an orifice with the fore portion of the chamber of the cylinder in advance of the piston, means for supplying fluid under pressure to the piston chamber and therethrough to such fore portion of the cylinder chamber, a valve operable to close the orifice upon initial movement of the piston and thereby trap the fluid ahead of the piston, and means operable by the fluid at a predetermined pressure for admitting the fluid to the aft portion of the cylinder chamber behind the piston to advance the piston against said trapped fluid.

2. A hydraulic power unit comprising a cylinder having a fluid containing chamber, a piston operable back and forth therein with a sliding fluid-sealed fit and dividing the chamber into fore and aft portions, said piston having a larger effective area in said aft portion than in said fore portion of said chamber, resilient means urging the piston to a normal position at one end of its stroke, said piston having a chamber normally communicating through an orifice with the fore portion of the chamber of the cylinder in advance of the piston, means for supplying fluid under pressure to the piston chamber and therethrough to such fore portion of the cylinder chamber, a valve operable to close the orifice upon initial movement of the piston and thereby trap the fluid ahead of the piston, the cylinder having an inlet passage through which the fluid is moved by said supplying means, a branch passage leading from the inlet passage into the aft portion of the cylinder chamber behind the piston, and pressure responsive means normally closing the branch passage and adapted to open at a predetermined pressure for the direct transmission of fluid pressure to the back face of the piston to advance said piston against fluid trapped ahead of said piston.

3. A hydraulic power unit comprising a cylinder having a fluid containing chamber, a piston operable back and forth therein with a sliding fluid-sealed fit and dividing the chamber into fore and aft portions, said piston having a larger effective area in said aft portion than in said fore portion of said chamber, resilient means urging the piston to a normal position at one end of its stroke, said piston having a chamber normally communicating through an orifice with the fore portion of the chamber of the cylinder in advance of the piston, means for supplying fluid under pressure to the piston chamber and therethrough to such fore portion of the cylinder chamber, a valve operable to close the orifice by and during initial movement of the piston and thereby trap the fluid ahead of the piston, said supplying means comprising an inlet nozzle fixed on the cylinder and slidably received by the piston chamber for discharging thereinto to the exclusion of the aft portion of the cylinder chamber behind the piston, and fluid pressure responsive means operable to admit fluid to the aft portion of the cylinder chamber behind the piston to advance said piston against fluid trapped in said fore portion of said chamber.

4. A hydraulic power unit comprising a cylinder having a fluid containing chamber, a piston operable back and forth therein with a sliding fluid-sealed fit and dividing the chamber into fore and aft portions, said piston having a larger effective area in said aft portion than in said fore portion of said chamber, resilient means urging the piston to a normal position at the piston retarded end of its stroke, an inlet nozzle carried by the cylinder within its chamber and extending toward the piston, the piston having a chamber slidably receiving the nozzle for receiving the fluid discharged therefrom, the piston chamber communicating with the fore portion of the cylinder chamber, a check valve operable to entrap the fluid in such fore portion, and means operable by fluid pressure of a predetermined degree for opening the aft portion of the cylinder chamber to such fluid and advancing said piston against fluid entrapped in said fore portion of said cylinder chamber.

5. A hydraulic power unit comprising a cylinder having a fluid containing chamber with an inlet passage at one end and a spaced outlet passage, a piston slidable in the chamber between the passages and dividing the chamber into a fore portion having a service outlet and an aft portion having a pressure fluid inlet, said piston having a chamber normally communicating through an orifice with the fore portion of the cylinder chamber in advance of the piston and having a greater effective area in said aft portion than in said fore portion of said chamber, a fixed nozzle projecting from the inlet passage into the piston contained chamber for supplying fluid through the latter to such fore portion of the cylinder chamber, means responsive to a predetermined fluid pressure in the inlet passage for admitting fluid to the aft portion of the cylinder chamber behind the piston to advance the latter, and a valve operable upon initial movement of said piston from its retarded position to close the passage between said piston chamber and said fore portion of said cylinder chamber and trap fluid in said fore portion ahead of said advancing piston whereby said differential area piston increases the fluid pressure in said fore portion of said cylinder chamber.

6. A hydraulic power unit comprising a cylinder having a fluid containing chamber with an inlet passage at one end and a spaced outlet passage, a piston slidable in the chamber between the passages and dividing the chamber into fore and aft portions, said piston having a chamber normally communicating through an orifice with the fore portion of the cylinder chamber in advance of the piston and having a greater effective area in said aft portion than in said fore portion of said chamber, a fixed nozzle projecting from the inlet passage into the piston contained chamber for supplying fluid through the latter to such fore portion of the cylinder chamber, the piston having a fluid sealed sliding fit on the nozzle to exclude the fluid from the aft portion of the cylinder chamber, the inlet passage having a branch passage leading into said aft portion, valve means normally closing the branch passage and responsive to pressure in the inlet passage above a predetermined value for opening the branch passage to admit pressure fluid behind said piston to advance the same, and a valve operable upon initial advance of said piston by said pressure fluid above said predetermined value to entrap fluid in said fore portion of said cylinder chamber ahead of said piston.

7. A hydraulic power unit comprising a cylinder having a fluid containing chamber with an inlet passage at one end and a spaced outlet passage, a piston slidable in the chamber between the passages and dividing the chamber into fore and aft portions, said piston having a chamber normally communicating through an orifice with the fore portion of the cylinder chamber in advance of the piston and having a greater effective area in said aft portion than in said fore portion, a fixed nozzle projecting from the inlet passage into the piston contained chambers for supplying fluid through the latter to such fore portion of the cylinder chamber, the piston having a fluid sealed sliding fit on the nozzle to exclude the fluid from the aft portion of the cylinder chamber, said piston having a forwardly extending stem, means slidably supporting the stem and sealing the latter against fluid leakage from the fore portion of the cylinder chamber, resilient means acting on the stem to return the piston to a normal position in the inlet end of the cylinder chamber, means responsive to fluid pressure above a predetermined value in the inlet passage for opening the latter to said aft portion, and a valve operable upon initial movement of said piston to entrap fluid in the fore portion of said cylinder chamber.

8. A hydraulic power unit comprising a cylinder having a fluid containing chamber with an inlet passage at one end and a spaced outlet passage, a piston slidable in the chamber between the passages and dividing the chamber into fore and aft portions, said piston having a chamber normally communicating through an orifice with the fore portion of the cylinder chamber in advance of the piston and having a greater effective area in said aft portion than in said fore portion of said chamber, a fixed nozzle projecting from the inlet passage into the piston contained chamber for supplying fluid through the latter to such fore portion of the cylinder chamber, pressure responsive means responsive to a fluid pressure above a predetermined value for opening the inlet passage to the aft portion and advance said piston, a valve operable upon initial forward movement of said piston to trap fluid in said fore portion of said cylinder chamber, the piston having a relief passage for establishing communication between the piston chamber and the aft portion of the cylinder chamber, and means normally closing the relief passage and responsive to a relatively higher pressure in the aft portion of said cylinder chamber than in said piston chamber for opening the relief passage whereby the piston may return to its retarded position in the inlet end of the cylinder chamber.

9. A hydraulic power unit comprising a cylinder having a fluid containing chamber with an inlet passage at one end and a spaced outlet passage, a piston slidable in the chamber between the passages and dividing the chamber into fore and aft portions, said piston having a chamber normally communicating through an orifice with the fore portion of the cylinder chamber in advance of the piston and having a greater effective area in said aft portion than in said fore portion of said chamber, a fixed nozzle projecting from the inlet passage into the piston contained chamber for supplying fluid through the latter to such fore portion of the cylinder chamber, means responsive to a predetermined fluid pressure in the inlet passage for admitting fluid to the aft portion of the cylinder chamber behind the piston to advance the latter, a valve operable upon initial forward movement of said piston to entrap fluid in said fore portion whereby further advance of said piston will increase the pressure on the entrapped fluid, a pneumatic motor operatively connected to the piston to assist said fluid pressure in advancing the same, and a control for the pneumatic motor cooperating with said pressure responsive means for opening and closing concurrently therewith.

10. A hydraulic system comprising a master cylinder with means for subjecting the fluid therein to pressure, a force multiplying unit having a cylinder with a chamber and a piston slidable in the chamber and dividing the latter into fore and aft portions, the piston having a chamber communicating with said fore portion and having a greater effective area in said aft portion than in said fore portion, the cylinder chamber having an inlet passage discharging into the piston chamber to the exclusion of the aft portion, pressure responsive means responsive to fluid pressure in said inlet passage above a predetermined value to open the inlet passage to the aft portion for moving the piston, means operative on initial movement of said piston to entrap fluid in said fore portion, a pneumatic motor connected to the piston for aiding the piston movement, and a control valve for the pneumatic motor normally held closed by the pressure responsive means and opening with the latter to regulate the motor.

11. A hydraulic system comprising a master cylinder with means for subjecting the fluid therein to pressure, a force multiplying unit having a cylinder with a chamber and a piston slidable in the chamber and dividing the latter into fore and aft portions, the piston having a chamber communicating with the fore portion and having a greater effective area in said aft portion than in said fore portion, the cylinder chamber having an inlet passage discharging into the piston chamber to the exclusion of the aft portion, pressure responsive means operable to open the inlet passage to the aft portion for moving the piston, means operative on initial movement of said piston to interrupt the communication between said piston chamber and said fore portion of said cylinder chamber to entrap the fluid in the fore portion, a pneumatic motor connected to the piston for aiding the piston movement, a control valve for the pneumatic motor, and a resilient connection between the control valve and the pressure responsive means for coordinating the opening and closing of the control valve with the opening and closing of the pressure responsive means.

12. A hydraulic power unit comprising a cylinder having a fluid containing chamber; a piston reciprocable in said cylinder with a sliding fluid-sealed fit and dividing the cylinder chamber into fore and aft portions and having a greater effective area in said aft portion than in said fore portion; resilient means urging the piston to a retracted position at one end of its stroke, said piston having a chamber, orifice means placing said piston chamber in fluid communication with the fore portion of the cylinder chamber in advance of the piston; means for supplying fluid under pressure to said piston chamber for delivery to the fore portion of the cylinder chamber; valve means in said piston operable to control fluid flow through said orifice means; means, automatically operable by fluid at a predetermined pressure, for admitting fluid to the aft portion of the cylinder chamber behind the piston, to cause the latter to move away from said retracted position against the action of said resilient means; and means, mounted stationarily with respect to said cylinder opening said valve; and resilient means closing said valve and causing it to cut off fluid flow through said orifice means between said piston chamber and the fore portion of said cylinder chamber when said piston has moved a predetermined distance away from said retracted position.

13. The hydraulic power unit defined in claim 12, wherein said valve means comprises a valve seat in the piston and an axially slidable valve urged toward said valve seat in the piston by a second resilient means, and said valve actuating means comprises a member carried by said cylinder and having an axially facing abutment operable to engage and open the valve against the action of said second resilient means when said piston moves into retracted position under the influence of said first resilient means.

14. In a hydraulic brake booster unit adapted to be actuated by a variable source of fluid pressure; a cylinder; a differential piston in said cylinder having a front face and a back face of materially larger area than the front face, said front and back faces of said piston being constantly axially spaced a fixed distance apart; a chamber in said unit; a passage placing said chamber in fluid communication with said cylinder forwardly of the front face of said piston, so that said front face is exposed to the fluid pressure in said chamber, means connecting said chamber to a source of fluid pressure; pressure responsive valve means for automatically exposing the back face of said piston to said pressure only when said pressure reaches a predetermined value, said piston being advanced to displace the fluid in said cylinder as said pressure increases beyond said predetermined value; means for automatically closing said passage and entrapping the fluid in said cylinder ahead of the front face of the piston when the latter moves a predetermined distance in fluid displacing direction; a power operator; means connecting said power operator to said piston; and means for automatically energizing said power operator at a predetermined value of fluid pressure from said source, for causing it to apply fluid displacing forces to said piston.

15. The brake booster unit defined in claim 14, wherein said power operator is automatically energized in accordance with operation of said pressure responsive valve for applying fluid displacing forces to said piston when its back face is exposed to pressure.

16. In a hydraulic booster, a cylinder; a hollow stem projecting axially into said cylinder; a piston reciprocable in said cylinder and having a front face and a rear face of larger effective area than its front face; a plurality of ports in said stem; means for applying variable pressures to the interior of said stem; one of said ports being operable to transmit pressure to the front face of said piston when the pressure in said stem is below a predetermined value; valve means operable to automatically open and apply pressure through a second of said ports to the rear face of said piston and cause the latter to advance in said cylinder; means for automatically closing off communication between said one port and the front face of said piston when the latter advances to a predetermined position, to thereby trap a body of fluid ahead of the piston; and means carried by said piston for automatically opening a third of said ports and applying fluid pressure directly to the rear face of said piston when the latter is advanced beyond said predetermined position.

17. In a hydraulic booster, a cylinder having an open front end and a closed rear end; a piston reciprocable in said cylinder and having a guide portion on its forward side sliding in sealing engagement with said cylinder and rendering the forward face of said piston of smaller area than the rear face thereof; a hollow sleeve projecting from the rear end of said cylinder into an opening in the rear end of said piston and sealingly cooperating therewith; an outlet in said cylinder ahead of said piston; port means placing said stem in fluid communication with said cylinder forwardly of said piston when the latter is in retracted position; valve means slidable on said stem and normally cutting off communication between said stem and the rear face of said piston and automatically operable to admit fluid to said rear face under a predetermined degree of throttling when the pressure in said stem attains a predetermined value and cause said piston to advance in said cylinder; means for automatically cutting off said port means when said piston has advanced a predetermined distance, means for automatically conducting fluid from said stem to the rear face of said piston when the latter is advanced a further distance; means for retracting said piston when the pressure in said stem falls to a predetermined value; and one-way means for conducting fluid directly from the space behind said piston to said stem when said piston undergoes a portion of its retracting movement.

18. In a fluid pressure booster having an inlet adapted to be connected to a source of fluid pressure and an outlet adapted to be connected to a device to be energized, a differential piston having faces of different effective area, said outlet being in fluid communication with the booster at the smaller face of said piston, means providing substantially direct fluid communication between said inlet and outlet when the pressure of the incoming fluid is below a predetermined amount, control means operable upon predetermined pressure of said incoming fluid for placing the larger face of said differential piston in relatively restricted fluid flow communication with said inlet while cutting off said substantially direct communication between the inlet and outlet to entrap fluid ahead of the piston, and means operative upon predetermined travel of said piston for establishing substantially direct fluid communication between the larger face of said differential piston and said inlet.

19. In the booster defined in claim 18, said control means comprising fluid flow metering means operable to exert a throttling action on fluid flow between the inlet and the cylinder behind said piston for smoothly blending together the resultant forces exerted at said outlet.

20. In a power brake system, a hydraulic master cylinder unit, a differential piston hydraulic booster unit having its inlet coupled to said master cylinder unit and its outlet coupled to suitable brake shoe actuating cylinders, a pneumatic power unit connected to the differential piston, a pneumatic pressure supply passage to said power unit equipped with a first control valve, a fluid pressure responsive second control valve in the inlet to said differential piston booster unit, means for by-passing said differential piston for applying master cylinder fluid pressure to said brake shoe cylinders until slack is taken up, means operable upon attaining a predetermined value of master cylinder pressure for actuating said second control valve for applying said master cylinder pressure to the large face of said differential piston, and means interconnecting said valves for concomitant opening and closing under control of the fluid pressure derived from said master cylinder.

CARROLL B. VICKERS.